3,415,906
PHOSPHITE PHOSPHOLANE AND PHOS-
PHORINANE COMPOUNDS
Alvin F. Shepard and Bobby F. Dannels, Grand Island,
N.Y., assignors to Hooker Chemical Corporation,
Niagara Falls, N.Y., a corporation of New York
No Drawing. Filed May 29, 1964, Ser. No. 371,179
3 Claims. (Cl. 260—937)

This invention relates to the production of new organic derivatives of phosphorus. More particularly, it relates to new cyclic derivatives of trivalent phosphorus having good hydrolytic stability.

In accordance with this invention, cyclic phosphites having good resistance to hydrolysis have been prepared having the formula

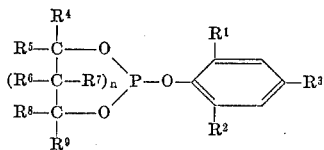

where $R^1$ and $R^2$ may be the same or different and are selected from the group consisting of alkyl having 3 to about 12 carbons, aralkyl having from 7 to about 15 carbons, $R^3$ is selected from the group consisting of hydrogen, alkyl having from 1 to 12 carbons, aralkyl having from 7 to 15 carbons, halogen, and lower dialkyl tertiary amino, $R^4$, $R^5$, $R^6$, $R^7$, $R^8$ and $R^9$ are the same or different and are selected from the group consisting of hydrogen, alkyl having from 1 to about 8 carbons, hydroxyalkyl having from 1 to about 5 carbons, and polyhydroxyalkyl having from about 1 to 5 carbons and $n$ is 0 to 1. The compounds thus contain the 1,3,2-dioxaphospholane ring or the 1,3,2-dioxaphosphorinane ring which have the following numbering systems, respectively.

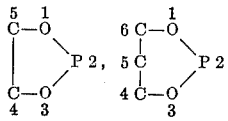

The preferred compound is ethylene-2,4,6-tri-tertiary-butylphenyl phosphite which is of value as a gasoline additive and as a stabilizing additive in polymers and resins such as polypropylene, polyethylene, polyvinylchloride, polyvinylidene chloride and so forth. Neopentyl 2,4,6-tri-tertiary-butylphenyl phosphite, 2-(2,4,6-tri - tertiary-butylphenoxy)-5,5-methyl-1,3,2-dioxaphosphorinane also is one of the useful compounds of the instant invention.

Typical examples of dioxaphospholane compounds within the instant invention are:

ethylene-2,6-di-tertiary-butylphenyl phosphite;
ethylene-2,6-diisopropylphenyl phosphite;
2,3-butylene-2,6-di(1-methyl-1-ethylamyl)-4-bromo-
  phenyl phosphite;
sorbityl-2,6-dinonylphenyl phosphite;
glyceryl-2,6-di-tertiary-butyl-4-ethylphenyl phosphite;
ethylene-2,6-didecyl-4-chlorophenyl phosphite;
ethylene-2,6-di-tertiary-butyl-4-butylphenyl phosphite;
2-methyl-1,2-pentylene-2,6-di-tertiary-butylphenyl
  phosphite;
1,2-butylene-2,6-di-α-phenylethyl-4-methylphenyl
  phosphite;
pinacol-2,6-di-tertiary-butyl-4-hexylphenyl phosphite;
ethylene-2,6-di-tertiary-butyl-4-hexylphenyl phosphite;
ethylene-2,6-di-tertiary-butyl-4-iodophenyl phosphite.

Typical examples of dioxaphosphorinane compounds included within the instant invention are:

2-(2,6-di-tertiary-butyl)phenoxy-1,3,2-dioxaphos-
  phorinane;
2-(2-tertiary-butyl-6-tertiary amyl-4-methyl) phenoxy-4-
  methyl-1,3,2-dioxaphosphorinane;
2-[2,6-di-(1-methyl-1-ethylamyl)-4-bromophenoxy]-5,5-
  dimethyl-1,3,2-dioxaphosphorinane;
2-(2,6-dinonylphenoxy)-4,4,6-trimethyl-1,3,2-dioxaphos-
  phorinane;
2-(2,6-di-tertiary-butyl-4-ethylphenoxy)-4-propyl-5-ethyl-
  1,3,2-dioxaphosphorinane;
trimethylyl propane-2-tertiary-butyl-6-tertiary-amyl-4-
  methylphenyl phosphite;
2-(2,6-didecyl-4-chlorophenoxy)-4,6-dimethyl-1,3,2-dioxa-
  phosphorinane;
2-(2,6-di-tertiary-butylphenoxy)-4-ethyl-5-methyl-1,3,2-
  dioxaphosphorinane;
2-(2,6-di-tertiary-butylphenoxy)-5,5-di-hydroxymethyl-
  1,3,2-dioxaphosphorinane;
2-(2,6-di-tertiary-butyl-4-methylphenoxy)-5-ethyl-5-hy-
  droxymethyl-1,3,2-dioxaphosphorinane;
2-(2,4,6-tri-tertiary-butylphenoxy)-4-propyl-6-methyl-1,3,
  2-dioxaphosphorinane;
2-(2,6-dihexyl-4-ethylphenylphenoxy)-4,4,6-trimethyl-1,3,
  2-dioxaphosphorinane;
2-(2,6-di-tertiarybutyl-4-iodophenoxy)-4-propyl-1,3,2-
  dioxaphosphorinane.

The above compounds can be made by reacting equimolecular proportions of the appropriate primary aromatic phosphorodihalidite with the appropriate glycol having adjacent hydroxyl groups in the case of the dioxaphospholanes or the appropriate polyhydric alcohol having one carbon atom between the two carbon atoms having hydroxyl groups attached thereto in the case of the dioxaphosphorinanes in the presence of a base such as pyridine or triethylamine or an alkali metal salt or hydride such as sodium hydroxide, sodium hydride, potassium phenoxide and so forth, as a hydrogen halide acceptor. Although the utilization of a tertiary base is preferred, the hydrogen halide formed may be removed by letting it distill off at the temperatures employed. Usually, from 2 to 10 moles of the acceptor is utilized per mole of phosphorodihalidite, with the preferred mole ratio being from about 2 to 5 moles of acceptor per mole of phosphorodihalidite.

Typical examples of phosphorodihalidites that may be utilized as starting materials in the present invention are 2,6-di-tertiary-butyl-phenyl phosphorodichloridite;
2,6-di-tertiary-butyl-4-chlorophenyl phosphorodibromidite;
2-tertiarylbutyl-6-tertiaryamyl-4-methylphenyl phos-
  phorodiiodite;
2,6-di(1-methyl-1-ethylamyl)-4-bromophenyl phosphoro-
  dichlorodite;
2,6-dinonylphenyl phosphorodichloridite;
2,6-di-tertiarybutyl-4-ethylphenyl-phosphorodiiodite;
2,6-didecyl-4-chlorophenyl phosphorodichloridite;
2,6-di-tertiarylbutyl-4-butylphenyl phosphorodichloridite;
2,4,6-tri-tertiary-butylphenyl phosphorodichloridite;
2,6-di-tertiary-butylphenyl phosphorodichloridite;
2,6-di-phenylethyl-4-nonylphenyl phosphorodichloridite;
2,6-di-tertiary-butylphenyl phosphorodibromidite;
2,6-di-tertiary-butyl-4-hexylphenyl phosphorodichloridite; and
2,6-di-tertiary-butyl-4-iodophenyl phosphorodiiodite.

The primary aromatic phosphorodihalidites may be prepared by reacting the 2,6-disubstituted, or 2,4,6-trisubstituted, phenol with phosphorus trihalide in equimolar proportions in the presence of an acid acceptor such as tertiary amine, e.g. triethylamine, trimethylamine, pyridine and so forth.

Among the polyhydric alcohol reactants that are employed are vicinal glycols, e.g., ethylene glycol; 1,2-propylene glycol; 1,1-butane diol; 2,3-butane diol; 2,3-dimethyl-2,3-butanediol (pinacol); 1,2-pentane diol; sorbitol; mannitol; glycerol; as well as glycols having one carbon atom between the two carbon atoms having the hydroxyl groups attached thereto including 2-methyl-2,4-pentanediol (hexylene glycol; 1,3-pentanediol; 1,3-butanediol; 2,2-dimethyl-1,3-propanediol (neopentyl glycol); 2-ethyl-1,3-hexanediol; 2,4-pentadiol; 2-methyl-1,3-pentanediol; 2,4-heptane diol; 2-diethyl-1,3-propane diol; 2-ethyl-2-n-butyl-1,3-propane diol; 1,3-propane diol; 1,1,1-trimethylol ethane; trimethylolpropane (1,1,1-trimethylolpropane); 1,2,3-trimethylolpropane; pentaerythritol; dipentaerythritol; tripentaerythritol; and anhydroenneoheptitol. The phosphorus trihalide may be phosphorus trichloride, phosphorus tribromide, phosphorous trifluoride, and phosphorus triiodide. The reaction between the glycol and aryl phosphorus dihalide is generally carried out at a temperature of from 0 to about 200 degrees centigrade with a preferred temperature range of from about 60 to 120 degrees centigrade. It has been found convenient to employ the temperature at which the hydrogen halide distills at the temperature and pressure employed. Thus, the pressure employed can be atmospheric, sub-atmospheric, or super-atmospheric. The reaction between the phenol and the phosphorus trihalide may be carried out at temperatures of from 0 to 50 degrees centigrade, with the preferred temperature range for this exothermic reaction being from about 10 to 20 degrees centigrade.

The extremely hydrolytically stable compounds of the present invention have numerous uses. Thus, they are effective plasticizers and stabilizers for vinylchloride resins and polyolefins such as polypropylene and chlorinated polyhalogenated olefins as stated above and as antioxidants.

The following examples illustrate the invention, but are not to be interpreted as limiting it in any respect. All parts are by weight and temperatures are in degrees centigrade unless otherwise indicated.

EXAMPLE 1.—NEOPENTYL 2,4,6-TRI-TERTIARY BUTYLPHENYL PHOSPHITE 2,4,6 - tri - tertiary - butylphenyl phosphorodichloridite (470 parts) was placed in a reactor. The reactor was heated to about 100 degrees centigrade and a solution of neopentyl glycol (136 parts) in triethyl amine (300 parts) was added to the reactor. The reactor was maintained at a temperature of about 100 degrees centigrade for a period of about 5 hours. The reaction mixture was cooled to ambient temperature and poured into a water bath having a temperature of from −5 to 15 degrees centigrade. A solid material was formed that was white in appearance. This material was washed three times with water and allowed to dry. It amounted to 500 parts. The product was crystallized from hexane and then from ethanol. It had a melting point of from 153 to 156 degrees centigrade and had the following phosphorus analysis:

Percent phosphorus.—calculated for indicated product: 7.87 percent. Found: 8.0 percent.

EXAMPLE 2.—ETHYLENE 2,4,6-TRI-TERTIARY-BUTYLPHENYL PHOSPHITE

Phosphorus trichloride (6900 parts) was charged to reactor. A solution of 2,4,6-tri-tertiary-butylphenol (13,200 parts), triethyl amine (17,700 parts) and toluene (17,339 parts) was added to the reactor which was maintained at a temperature of from 0 to 20 degrees centigrade. The reaction mixture was heated to a temperature in the range from 95 to 110 degrees centigrade for a period of about 2 hours. Ethylene glycol (about 3,100 parts) was added to the reactor and the mixture heated from about 95 to 110 degrees centigrade for a period of 7 hours. The product was cooled to ambient temperature and poured into a water bath maintained at a temperature of 0 to 15 degrees centigrade. White crystals were formed. These crystals were washed twice with water and recrystallized from hexane. Their melting point was 173 to 174 degrees centigrade.

The product was analyzed by infra red means and nuclear magnetic resonance analysis. The results indicated the structure of the residue crystals to be

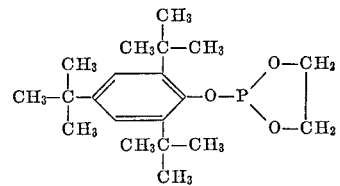

Phosphorus analysis showed the following:
Percent phosphorus.—calculated for indicated compound: 8.82 percent. Found: 8.97 percent.

A wide variety of aliphatic polyhydric alcohols and phenols may be utilized, as set forth above. These are shown in greater detail in the following examples giving the stoichiometry for various reactants.

EXAMPLE 3

One mole of phosphorus trichloride is reacted with 1 mole of 2,6-di-(1-methyl-1-ethyl amyl)-4-bromophenol to give the corresponding phosphorodichloridite. One mole of the phosphorodichloridite is reacted with 1 mole of ethylene glycol to give a compound having the structure:

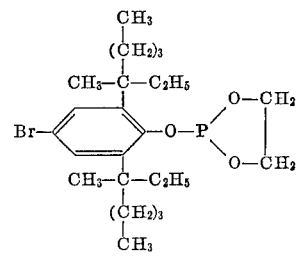

EXAMPLE 4

One mole of 2,6-di-tertiary-butylphenyl phosphorodichloridite, 1 mole of 1,2-dihydroxybutane in the presence of triethyl amine are reacted to give a compound having the structure:

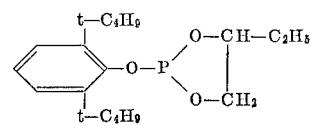

EXAMPLE 5

One mole of 2,6-di-p-nonyl-phenylethyl-4-methylphenyl phosphorodibromidite with 1 mole of 2,4-dihydroxyhexane are reacted to give a compound having the structure:

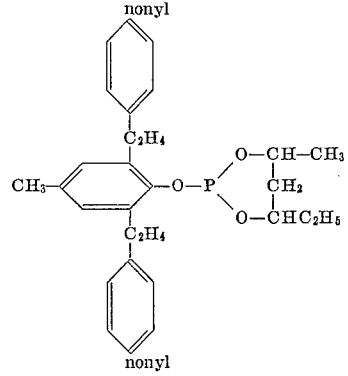

EXAMPLE 6

One mole of 2,6-di-tertiary-butyl-4-dihexyl aminophenyl phosphorodichloridite reacted with 1 mole of 1,2-propylene glycol are reacted to give a compound having the structure:

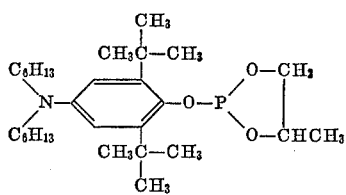

EXAMPLE 7

One mole of 2,6-tri-tertiary-butylphenyl phosphorodichloridite with 1 mole of pentaerythritol are reacted to give a compound having the structure:

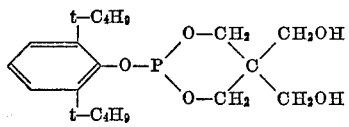

As set forth earlier, the compounds prepared in accordance with the present invention are useful as additives in petroleum products and may also be added to greases, oils, gasoline or kerosene, serving as effective and stable antioxidants. A synergistic effect with barium laurate in polyvinyl chloride resins may also be realized utilizing the phosphites of the present invention to stabilize the resins.

While there have been described various embodiments of the invention, the compositions and methods described are not intended to be understood as limiting the scope of the invention, as it is realized that changes therein are possible and it is further intended that each element is to be understood as referring to all equivalent elements for accomplishing substantially the same results in substantially the same or equivalent manner, it covering the invention broadly in whatever form its principle may be utilized.

What is claimed is:

1. A phosphite having the formula:

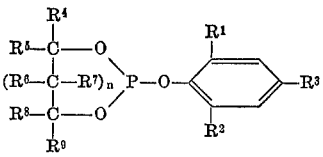

wherein $R^1$ and $R^2$ are selected from the group consisting of alkyl having from 3 to about 12 carbons, aralkyl having from 7 to about 15 carbons, $R^3$ is selected from the group consisting of hydrogen, alkyl, aralkyl, halogen and dialkyl tertiary amino, $R^4$, $R^5$, $R^6$, $R^7$, $R^8$, and $R^9$ are selected from the group consisting of hydrogen, alkyl, hydroxyalkyl, polyhydroxyalkyl and $n$ is 0 to 1.

2. Neopentyl 2,4,6-tri-tertiary-butylphenyl phosphite.
3. Ethylene 2,4,6-tri-tertiary-butylphenyl phosphite.

References Cited

UNITED STATES PATENTS

| | | | |
|---|---|---|---|
| 2,839,563 | 6/1958 | Hechenbleikner | 260—937 XR |
| 3,039,993 | 6/1962 | Friedman | 260—973 XR |
| 3,205,250 | 9/1965 | Hechenbleikner | 260—937 XR |

CHARLES B. PARKER, *Primary Examiner.*

A. H. SUTTO, *Assistant Examiner.*

U.S. Cl. X.R.

260—973, 306, 457